(12) United States Patent
Luth et al.

(10) Patent No.: US 11,816,659 B2
(45) Date of Patent: Nov. 14, 2023

(54) SYSTEMS AND METHODS OF AUXILIARY TRANSACTION SECURITY, VALIDATION, RECORDATION, AND TRACKING

(71) Applicant: Rotomaire, Inc., Fair Haven, NJ (US)

(72) Inventors: Jehan Luth, Oceanport, NJ (US); Elijah Baker, Jacksonville, FL (US); Wilfried Schobeiri, Chicago, IL (US)

(73) Assignee: Rotomaire, Inc., Fair Haven, NJ (US)

( * ) Notice: Subject to any disclaimer, the term of this patent is extended or adjusted under 35 U.S.C. 154(b) by 107 days.

(21) Appl. No.: 17/376,410

(22) Filed: Jul. 15, 2021

(65) Prior Publication Data
US 2023/0018316 A1    Jan. 19, 2023

(51) Int. Cl.
*G06Q 20/36* (2012.01)
*G06Q 20/04* (2012.01)
*G06Q 20/40* (2012.01)
*G06Q 20/38* (2012.01)
*G06F 21/62* (2013.01)

(52) U.S. Cl.
CPC ....... *G06Q 20/363* (2013.01); *G06F 21/6254* (2013.01); *G06Q 20/047* (2020.05); *G06Q 20/389* (2013.01); *G06Q 20/4014* (2013.01)

(58) Field of Classification Search
CPC .................. G06Q 20/00–425; G06F 21/00–88
See application file for complete search history.

(56) References Cited

U.S. PATENT DOCUMENTS

| | | | | |
|---|---|---|---|---|
| 9,818,091 | B2* | 11/2017 | Argue ................. | G06Q 20/047 |
| 2003/0004811 | A1* | 1/2003 | Omori ................. | G07F 7/1008 |
| | | | | 705/17 |
| 2003/0036999 | A1* | 2/2003 | Mirlas ................. | G06Q 30/04 |
| | | | | 705/40 |
| 2003/0069858 | A1* | 4/2003 | Kittlitz ................ | G07G 5/00 |
| | | | | 705/76 |
| 2003/0216975 | A1* | 11/2003 | Montey .............. | G06Q 10/087 |
| | | | | 705/28 |
| 2008/0162298 | A1 | 7/2008 | Aliabadi et al. | |
| 2010/0017332 | A1 | 1/2010 | Kight et al. | |
| 2011/0246234 | A1* | 10/2011 | Irwin .................. | G06F 16/215 |
| | | | | 705/3 |
| 2012/0041881 | A1 | 2/2012 | Basu et al. | |
| 2012/0084263 | A1 | 4/2012 | Gosnell | |

(Continued)

*Primary Examiner* — John W Hayes
*Assistant Examiner* — Chenyuh Kuo
(74) *Attorney, Agent, or Firm* — TROUTMAN PEPPER HAMILTON SANDERS LLP; James E. Schutz; Jacob M. Burr

(57) ABSTRACT

A system including: a processor; and a memory having stored thereon instructions that, when executed by the processor, controls the processor to: receive a receipt request for a transaction from a remote device, the receipt request comprising a merchant identifier, a transaction amount, and a transaction date and time; query the receipt database for a receipt record corresponding to the transaction based on the merchant identifier, the transaction amount, and the transaction date and time, the query being conducted without the benefit of sensitive information; in response to identifying a receipt record corresponding to the transaction, retrieve the receipt record corresponding to the transaction from the receipt database; and output for transmission the receipt record to the remote device.

13 Claims, 8 Drawing Sheets

(56) References Cited

U.S. PATENT DOCUMENTS

| | | | |
|---|---|---|---|
| 2013/0054513 A1* | 2/2013 | Jones | G06F 16/972 |
| | | | 707/607 |
| 2014/0006096 A1* | 1/2014 | Groarke | G06Q 30/02 |
| | | | 705/7.29 |
| 2014/0032347 A1* | 1/2014 | Argue | G06Q 20/209 |
| | | | 705/21 |
| 2014/0039973 A1* | 2/2014 | Groarke | G06Q 30/06 |
| | | | 705/7.29 |
| 2014/0039974 A1* | 2/2014 | Groarke | G06Q 30/0201 |
| | | | 705/7.29 |
| 2014/0040141 A1* | 2/2014 | Gauvin | G06Q 20/042 |
| | | | 705/45 |
| 2014/0047551 A1* | 2/2014 | Nagasundaram | H04L 63/107 |
| | | | 726/26 |
| 2014/0074690 A1* | 3/2014 | Grossman | G06Q 20/047 |
| | | | 705/39 |
| 2014/0114787 A1* | 4/2014 | Groarke | G06Q 30/08 |
| | | | 705/26.3 |
| 2014/0114789 A1* | 4/2014 | Groarke | G06Q 30/08 |
| | | | 705/26.3 |
| 2014/0188648 A1* | 7/2014 | Argue | G06Q 20/047 |
| | | | 705/26.1 |
| 2015/0052062 A1* | 2/2015 | Flomin | G06Q 30/0633 |
| | | | 705/26.8 |
| 2015/0356522 A1* | 12/2015 | Matsumoto | G06Q 20/322 |
| | | | 705/30 |
| 2016/0196538 A1* | 7/2016 | Mori | G06Q 20/047 |
| | | | 705/16 |
| 2016/0224976 A1 | 8/2016 | Basu et al. | |
| 2018/0204221 A1* | 7/2018 | Groarke | G06Q 30/02 |
| 2020/0117824 A1* | 4/2020 | Upadhyay | G06F 16/258 |
| 2022/0207532 A1* | 6/2022 | Daetz | G06Q 20/405 |
| 2022/0222632 A1* | 7/2022 | Britt | G06F 16/245 |
| 2023/0018316 A1* | 1/2023 | Luth | G06Q 20/389 |

\* cited by examiner

SYSTEMS AND METHODS OF AUXILIARY TRANSACTION SECURITY, VALIDATION, RECORDATION, AND TRACKING

FIELD

The disclosed technology generally relates to transaction validation and, more particularly, to systems and methods for providing remote, auxiliary security, validation, recordation, and tracking of transactions.

BACKGROUND

Transaction verification is a very old problem. Typically, receipts are issued to participants in transactions to provide evidence that the transaction has been completed. Traditionally, duplicate paper receipts are issued to both parties of the transaction. The advent of electronic transactions has led to the issuance of receipts in an electronic format, e.g., via email. While electronic receipts may be more convenient for storing, different practices from different merchants make storing receipts impractical. Furthermore, receipt data cannot be easily combined across different purchases, as each purchase is reflected in a separate document. Therefore, there is a need for improved systems and methods to provide auxiliary transaction validation, recordation, and tracking.

As an additional drawback, in the related art, electronic receipts requires the exchange of personal information of the user (e.g., contact information), which can be surreptitiously accessed. This requirement creates a pain point in the electronic receipt process and can lead away from the adoption of electronic receipts as users may have convenience and/or security concerns. Thus, there is a further need for improved systems and methods to provide a connection that enables the transfer of receipt information without the provision of sensitive data.

Certain aspects of the present disclosure attempt to address these and other issues.

SUMMARY

According to aspects of the present disclosure, there is provided a system including: a processor; and a memory having stored thereon instructions that, when executed by the processor, controls the processor to: receive a receipt request for a transaction from a remote device, the receipt request comprising a merchant identifier, a transaction amount, and a transaction date and time; query the receipt database for a receipt record corresponding to the transaction based on the merchant identifier, the transaction amount, and the transaction date and time, the query being conducted without the benefit of sensitive information; in response to identifying a receipt record corresponding to the transaction, retrieve the receipt record corresponding to the transaction from the receipt database; and output for transmission the receipt record to the remote device.

The instructions, when executed by the processor, may further control the processor to: in response to determining that a receipt record corresponding to the transaction is not included in the receipt database: output, to a merchant system associated with the merchant identifier, a request for updated transaction data; receive, from the merchant system associated with the merchant identifier, the updated transaction data; and generate the receipt record corresponding to the transaction from the updated transaction data;

The receipt request may include sensitive data. The instructions, when executed by the processor, may further control the processor to actively scrub the sensitive data.

Actively scrubbing the sensitive data may include: identifying, while the transaction identification information is in live memory, the sensitive data contained within the receipt request; excluding the sensitive data from transmission to a persistent storage; and purging the sensitive data from the live memory.

The instructions, when executed by the processor, may further control the processor to: receive transaction data from a plurality of merchant systems; format the transaction data into receipt data; and store the receipt data as receipt records for one or more transactions.

Formatting the transaction data may include actively scrubbing the transaction data of sensitive data.

Actively scrubbing the transaction data of sensitive data may include: identifying, while the transaction data is in live memory, sensitive data contained within the transaction data, the sensitive data comprising at least one from among a customer name, a transaction account number, and excluding the sensitive data from transmission to a persistent storage; and purging the sensitive data from the live memory.

The system may be configured to receive the transaction data from the merchant system corresponding to a batch of transactions.

The receipt request may include a customer identification token. The instructions, when executed by the processor, may further control the processor to append the customer identification token to the receipt record for transmission to the remote device.

According to aspects of the present disclosure, there is provided a method including: receiving a receipt request for a transaction from a remote device; querying a receipt database for a receipt record corresponding to the transaction, the query being conducted without the benefit of sensitive information; retrieving the receipt record; and outputting the receipt record for transmission to the remote device.

The receipt request may include transaction identification information including at least one from among a transaction amount, a merchant name or identifier, and a transaction date and time, the querying the receipt database being based on the transaction identification information.

The method may further include, in response to determining that the receipt record is not included in the receipt database: outputting, to a merchant system associated with the transaction, a request for receipt data; and receiving, from the merchant system, the receipt data.

The receipt request may include transaction identification information. The method may further include actively scrubbing the transaction identification information of sensitive data.

Actively scrubbing the transaction identification information may include: identifying, while the transaction identification information is in live memory, sensitive data contained within the transaction identification information; excluding the sensitive data from transmission to a persistent storage; and purging the sensitive data from the live memory.

The method may further include: receiving transaction data from a merchant system; formatting the transaction data into receipt data; and storing the receipt data as receipt records for one or more transactions.

The method may further include actively scrubbing the transaction data of sensitive data.

Actively scrubbing the transaction data of sensitive data may include: identifying, while the transaction data is in live memory, sensitive data contained within the transaction data; excluding the sensitive data from transmission to a persistent storage; and purging the sensitive data from the live memory.

The active scrubbing may be performed on a module executed on the merchant system before being received.

According to aspects of the present disclosure, there is provided a system comprising: a processor; and a memory having stored thereon instructions that, when executed by the processor, controls the processor to: receive transaction data from a plurality of merchant systems for one or more transactions; actively scrub the transaction data of sensitive data by: identifying, while the transaction data is in live memory, sensitive data contained within the transaction data, the sensitive data comprising at least one from among a customer name, a transaction account number, excluding the sensitive data from transmission to a persistent storage, and purging the sensitive data from the live memory, format the transaction data into receipt data; store the receipt data as receipt records for the one or more transactions in a receipt database; receive a receipt request for a transaction from a remote device, the receipt request comprising a customer identification token, a merchant identifier, a transaction amount, and a transaction date and time; query the receipt database for a receipt record corresponding to the transaction based on the merchant identifier, the transaction amount, and the transaction date and time, the query being conducted without the benefit of sensitive information; in response to identifying a receipt record corresponding to the transaction, retrieve the receipt record corresponding to the transaction from the receipt database; in response to determining that a receipt record corresponding to the transaction is not included in the receipt database: output, to a merchant system associated with the merchant identifier, a request for updated transaction data; receive, from the merchant system associated with the merchant identifier, the updated transaction data; and generate the receipt record corresponding to the transaction from the updated transaction data; append the customer identification token to the receipt record corresponding to the transaction; and output for transmission the receipt record to the remote device.

BRIEF DESCRIPTION OF THE FIGURES

Reference will now be made to the accompanying figures and flow diagrams, which are not necessarily drawn to scale, and wherein.

DETAILED DESCRIPTION

Figure 1A:
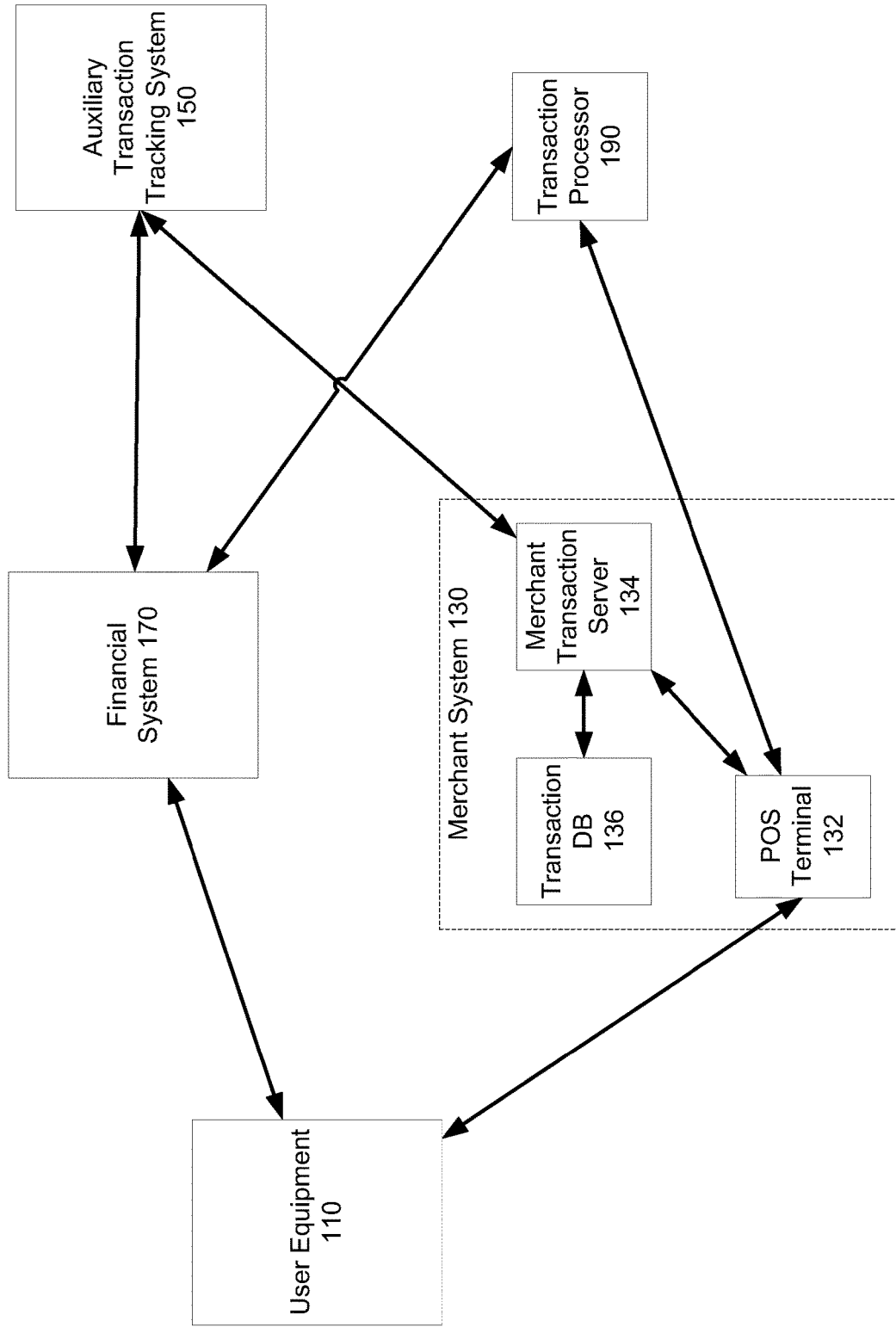
FIGS. 1A-1D are diagrams of example system environment(s) that may be used to implement one or more embodiments of the present disclosure.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after the development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

According to some embodiments, there are provided systems and methods for providing remote, auxiliary validation, recordation, and tracking of transactions. In an embodiment, a user may affect a purchase at a point-of-sale device. The point of sale device can provide transaction receipt information dynamically and securely. For example, by leveraging non-sensitive data (e.g., transaction date, transaction amount, merchant name), the system can uniquely identify each transaction without comprising sensitive data. This enables the exchange of receipts between parties with low or no trust or verification, as only trusted entities could know the same information. This type of authentication materially differs from the prior approaches, which require the use of transaction account numbers or other sensitive data.

In some embodiments, the system may actively scrub sensitive data from memory. For example, if receipt data includes sensitive data that is not necessary for matching (e.g., customer name, full account number), the system can actively identify and exclude this sensitive data from storage.

Reference will now be made in detail to example embodiments of the disclosed technology, examples of which are illustrated in the accompanying drawings and disclosed herein. Wherever convenient, the same references numbers will be used throughout the drawings to refer to the same or like parts.

FIGS. 1A-1D are diagrams of example system environments that may be used to implement one or more embodiments of the present disclosure. The components and arrangements shown in FIGS. 1A-1D are not intended to limit the disclosed embodiments as the components used to implement the disclosed processes and features may vary. Additionally, various components of the FIGS. may be combined and matched together.

Referring to FIG. 1A, in accordance with disclosed embodiments, system environment 100a may include user equipment (UE) 110 in communication with a merchant system 130 and a financial system 170. For example, a user of UE 110 may have an account with financial system 170 (e.g., a transaction card account) and be a customer of a merchant of the merchant system. UE 110 may initiate a transaction with a point-of-sale (POS) terminal 132 of merchant system 130, e.g., via an online transaction. POS terminal 132 may communicate with transaction processor 190 to receive payment for the transaction from financial system 170. Once confirmed, POS terminal 132 may provide transaction data to the merchant transaction server 134. The transaction data may include no potentially-sensitive information, for example, only item-level detail of the transaction (e.g., an itemized invoice), transaction date and time, and a merchant identifier. In some cases, the transaction data may further include semi-sensitive data, such as, for example, a transaction confirmation number, a customer token, or a last four digits of a payment card. Merchant transaction server 134 can store the transaction data in the transaction database (DB) 136.

Auxiliary transaction tracking system 150 may communicate with merchant transaction server 134 to receive the transaction data to share specific details with financial system 170. For example, financial system 170 may know a customer name, merchant name, total cost, and date and time of a specific transaction, but may not have transaction line-item information. Financial system 170 may provide the known information to auxiliary transaction tracking system 150, which can locate the inventory-level receipt information from the receipt data received from merchant transaction server 134, and provide the inventory-level receipt information to financial system 170. Financial system 170 may then provide the receipt information to the user device 110 for later review and comparison.

Figure 1B:
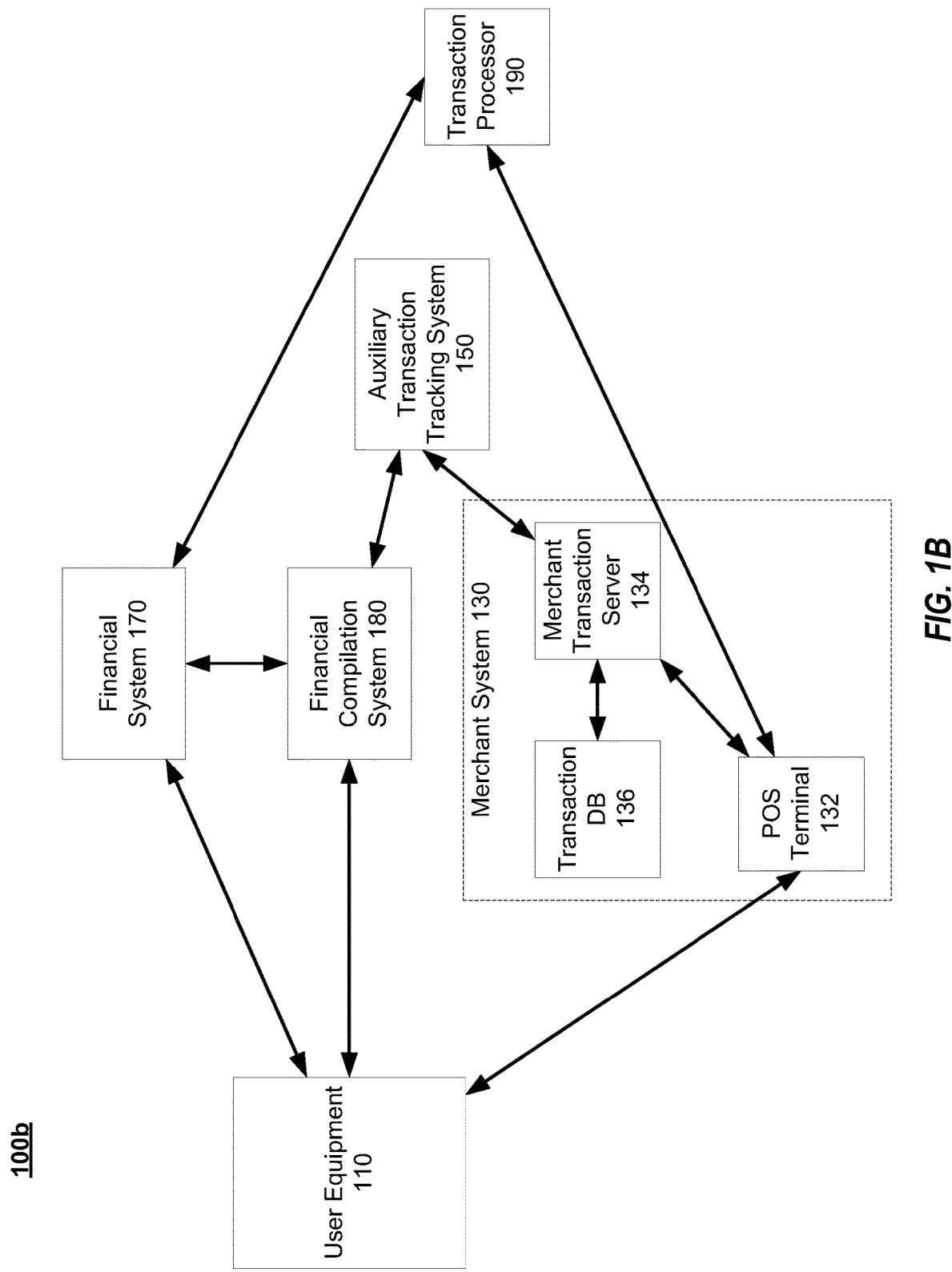

Referring to FIG. 1B, in accordance with disclosed embodiments, system environment 100b may include user equipment (UE) 110 in communication with a merchant system 130 and a financial system 170. The merchant system 130 may utilize a transaction processor 190 to effect to receive payment for the transaction from financial system 170. Once confirmed, POS terminal 132 may provide transaction data to the merchant transaction server 134. Merchant transaction server 134 can store the transaction data in transaction database (DB) 136 and share the transaction data with auxiliary transaction tracking system 150.

In FIG. 1B, a financial compilation system 180 provides the receipt level data to user equipment 110. For example, financial compilation system 180 may be a budget-tracking system that integrates with various financial accounts to retrieve high-level transaction details (e.g., transaction price, date, and merchant identifier). Financial compilation system 180 may then provide these high-level details to auxiliary transaction tracking system 150 as proof of authorization to retrieve line-item information on the transaction. Auxiliary transaction tracking system 150 can provide the item-level transaction data to financial compilation system 180. Financial compilation system 180 may then compile and provide the transaction-level information to user equipment 110. In some cases, financial system 170 may include a customer identifier or token with the high-level transaction details. For example, the customer token could be an encrypted or hashed portion of a transaction card number associated with the transaction. Auxiliary transaction tracking system 150 may then include the token with the line-item information of the transaction to enable better tracking by financial system 170 (e.g., if there is a delay between the request for the receipt data and the furnishment of the receipt data).

Figure 1C:
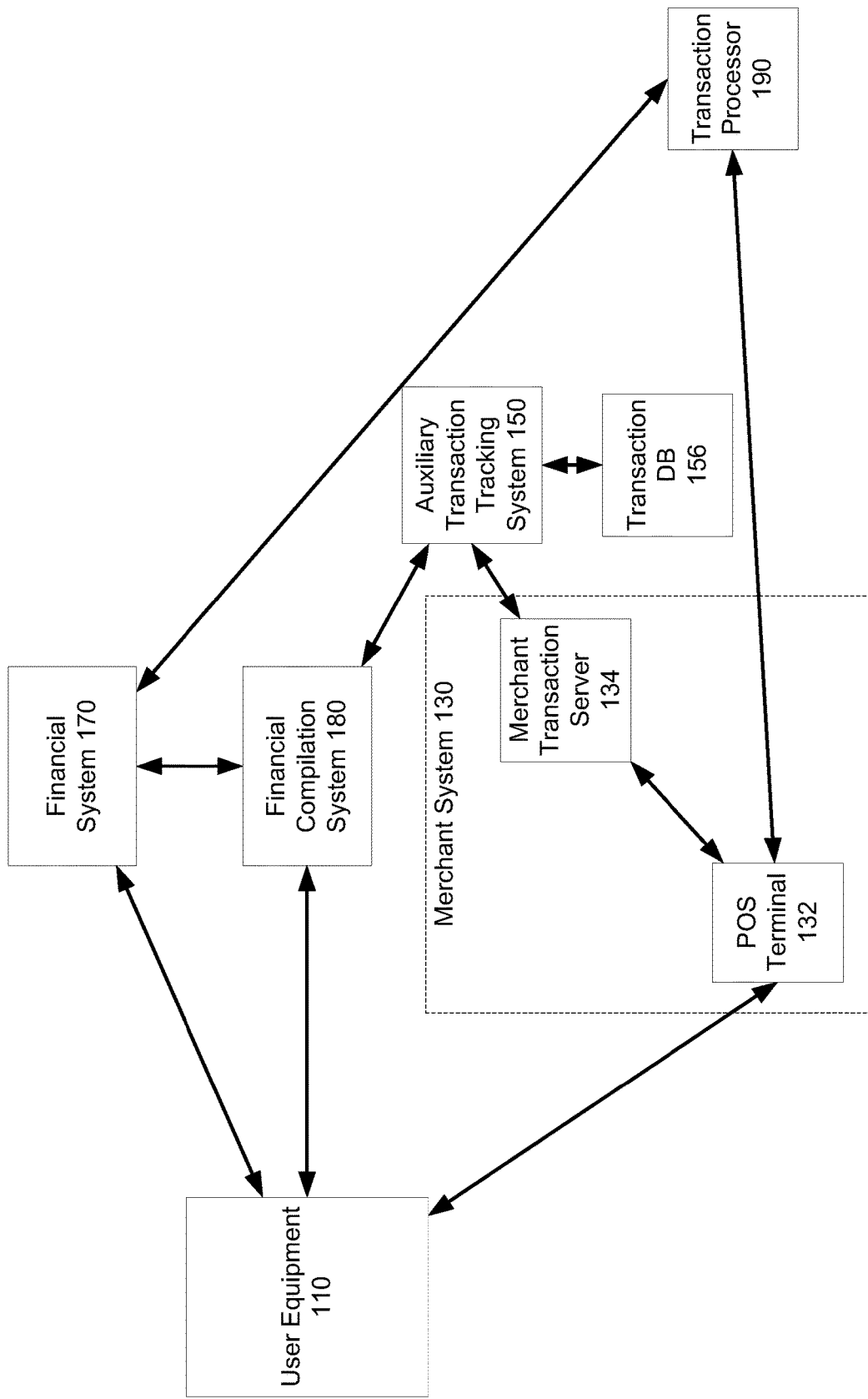

Referring to FIG. 1C, in accordance with disclosed embodiments, system environment 100c may include user equipment (UE) 110 in communication with a merchant system 130 and a financial system 170. The merchant system 130 may utilize a transaction processor 190 to effect to receive payment for the transaction from financial system 170. Once confirmed, POS terminal 132 may provide transaction data to the merchant transaction server 134. Merchant transaction server 134 can provide the transaction data to auxiliary transaction system 150, which stores the receipt level data in transaction DB 156. In this way, the auxiliary transaction tracking system 150 may provide receipt tracking and management to merchant system 130 directly.

As in FIG. 1B, a financial compilation system 180 provides the receipt level data to user equipment 110. For example, financial compilation system 180 may be a budget-tracking system that integrates with various financial accounts to retrieve high-level transaction details (e.g., transaction price, date, and merchant identifier). Financial compilation system 180 may then provide these high-level details to auxiliary transaction tracking system 150 as proof of authorization to retrieve line-item information on the transaction. Auxiliary transaction tracking system 150 can provide the item-level transaction data to financial compilation system 180. Financial compilation system 180 may then compile and provide the transaction-level information to user equipment 110.

Figure 1D:
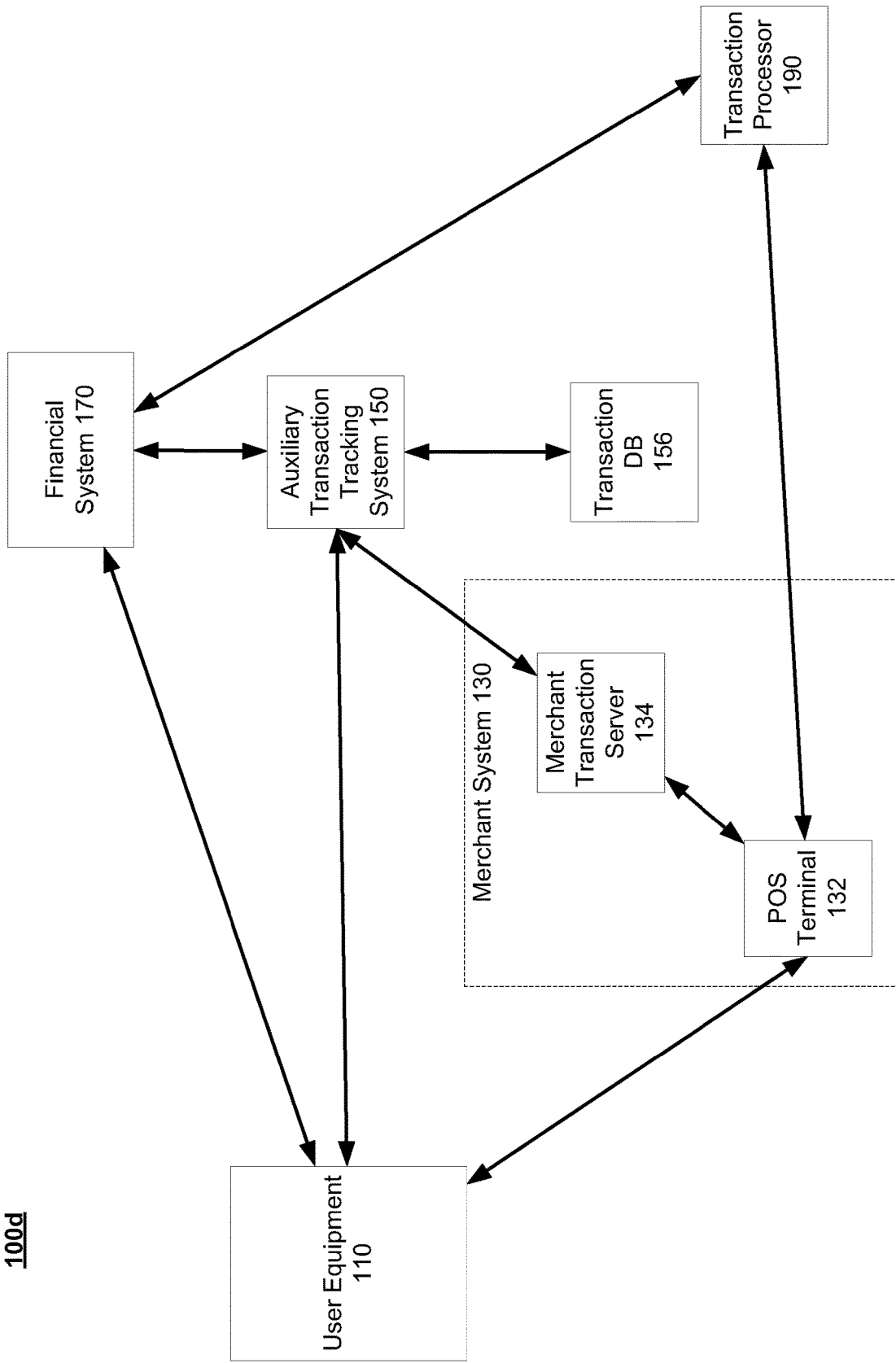

Referring to FIG. 1D, in accordance with disclosed embodiments, system environment 100d may include user equipment (UE) 110 in communication with a merchant system 130 and a financial system 170. The merchant system 130 may utilize a transaction processor 190 to effect to receive payment for the transaction from financial system 170. Once confirmed, POS terminal 132 may provide transaction data to the merchant transaction server 134. Merchant transaction server 134 can provide the transaction data to auxiliary transaction system 150, which stores the receipt-level data in transaction DB 156.

Merchant system 130 may request that auxiliary transaction tracking system 150 provide an electronic receipt to the user (via UE 110), and may rely on auxiliary transaction tracking system 150 to determine user contact information. In an embodiment, auxiliary transaction tracking system 150 may retrieve transaction information from financial system 170 and match the transaction data to a particular. For example, auxiliary transaction tracking system 150 may compare a merchant id, transaction amount, and/or transaction data and time from the transaction data with similar fields in the transaction information. If a match is found, the transaction data may be forwarded to user contact information held by the financial system 170. In some cases, Auxiliary transaction tracking system 150 may send the receipt data to UE 110 (e.g., via email or text message) directly. However, this is merely an example and, in some cases, auxiliary transaction tracking system 150 may provide the transaction data to financial system 170, which can then forward an electronic receipt to UE 110.

Figure 2:
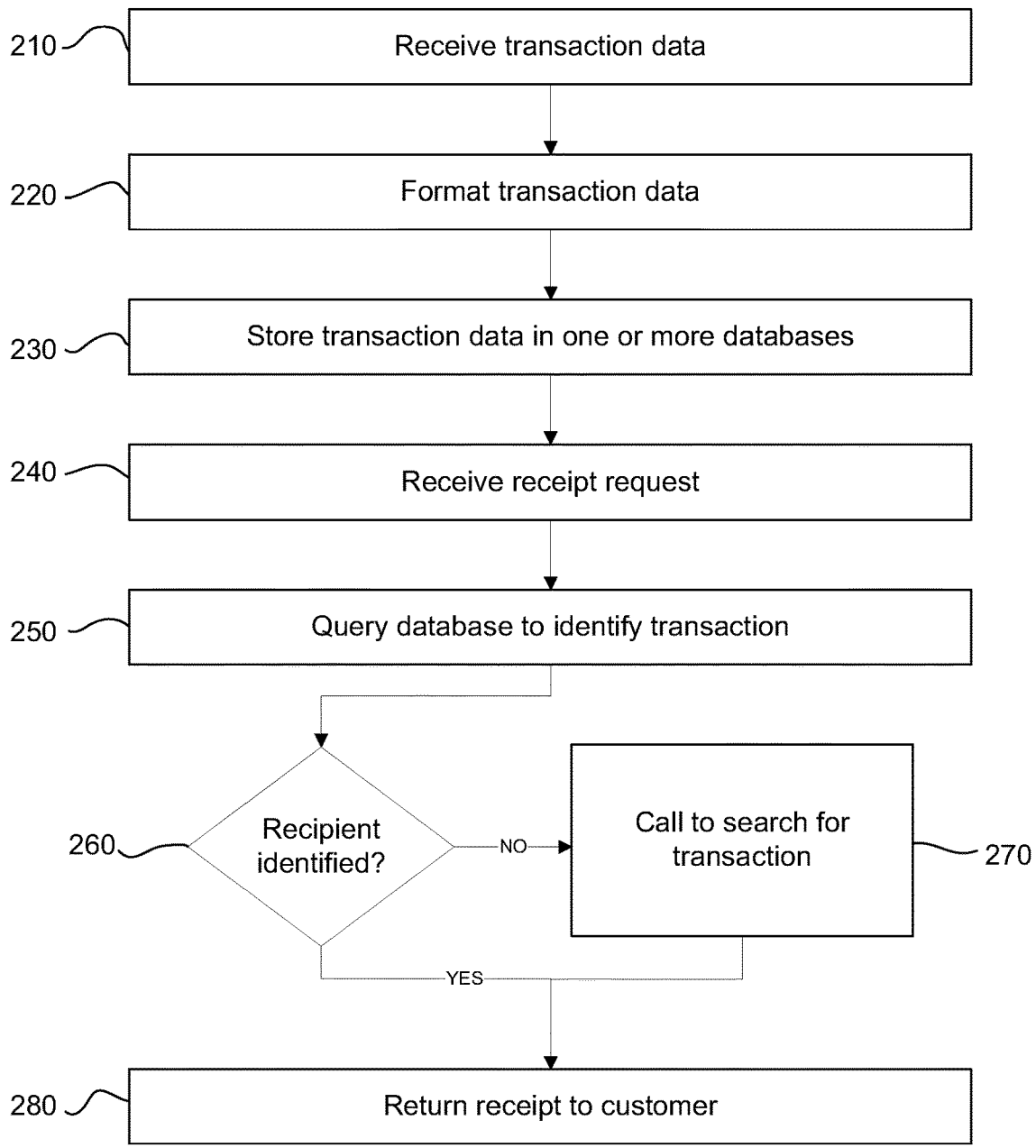
FIGS. 2 and 3 are flow diagrams of transaction management methods according to an embodiment.

FIG. 2 is a flow diagram 200 of a transaction management method according to an embodiment. Method 200 may be performed, for example, by auxiliary transaction tracking system 150. Referring to FIG. 2, auxiliary transaction tracking system 150 receives 210 receipt information (e.g., from one or more merchant systems 130). The receipt data may be received individually or in batches. The auxiliary transaction tracking system 150 may format 220 the receipt data for processing, storage, and management. For example, the transaction data may be formatted into an electronic receipt. Alternatively or additionally, the transaction data may be stored in a data structure (e.g., transaction table) that can be more easily searchable and used to generate an electronic receipt. In some cases, the transaction data may include no sensitive information. For example, the transaction data may include a transaction amount, a merchant name or identifier, transaction date and time, and line-item transaction details. In other cases, the transaction data may include additional information such as, for example, a transaction confirmation number, a last four digits of a payment account, and/or a unique customer token.

The transaction data can be stored 230 in one or more databases (e.g., transaction DB 136 or 156). For example, auxiliary transaction system 150 can store 230 the transaction data within a first, relational database for internal use and searching, and a second, document-database formatted database for rapid searching and return of receipt data. Auxiliary transaction system 150 may further sync between a plurality of databases to identify issues in either. This active memory management can keep the database systems clean from sensitive data.

Auxiliary transaction system 150 receives 240 a receipt request. For example, the receipt request may be received from merchant system 130 with the transaction data. The receipt request may be a request to provide an electronic receipt to a customer. However, as discussed above, merchant system 130 may not have contact information for the customer. Accordingly, auxiliary transaction system 150 may query 250 the databases (e.g., transaction DB 156) for transaction details from financial system 170. If a transaction is identified that matches the transaction data (260-Yes), auxiliary transaction system 150 can return 280 the receipt to the customer based on contact information from the financial system 170. For example, auxiliary transaction system 150 can send a receipt for the transaction to the UE 110 directly (e.g., via email or text). In some cases, auxiliary transaction system 150 can provide the receipt to financial system 170, which forward the receipt to UE 110.

Figure 3:
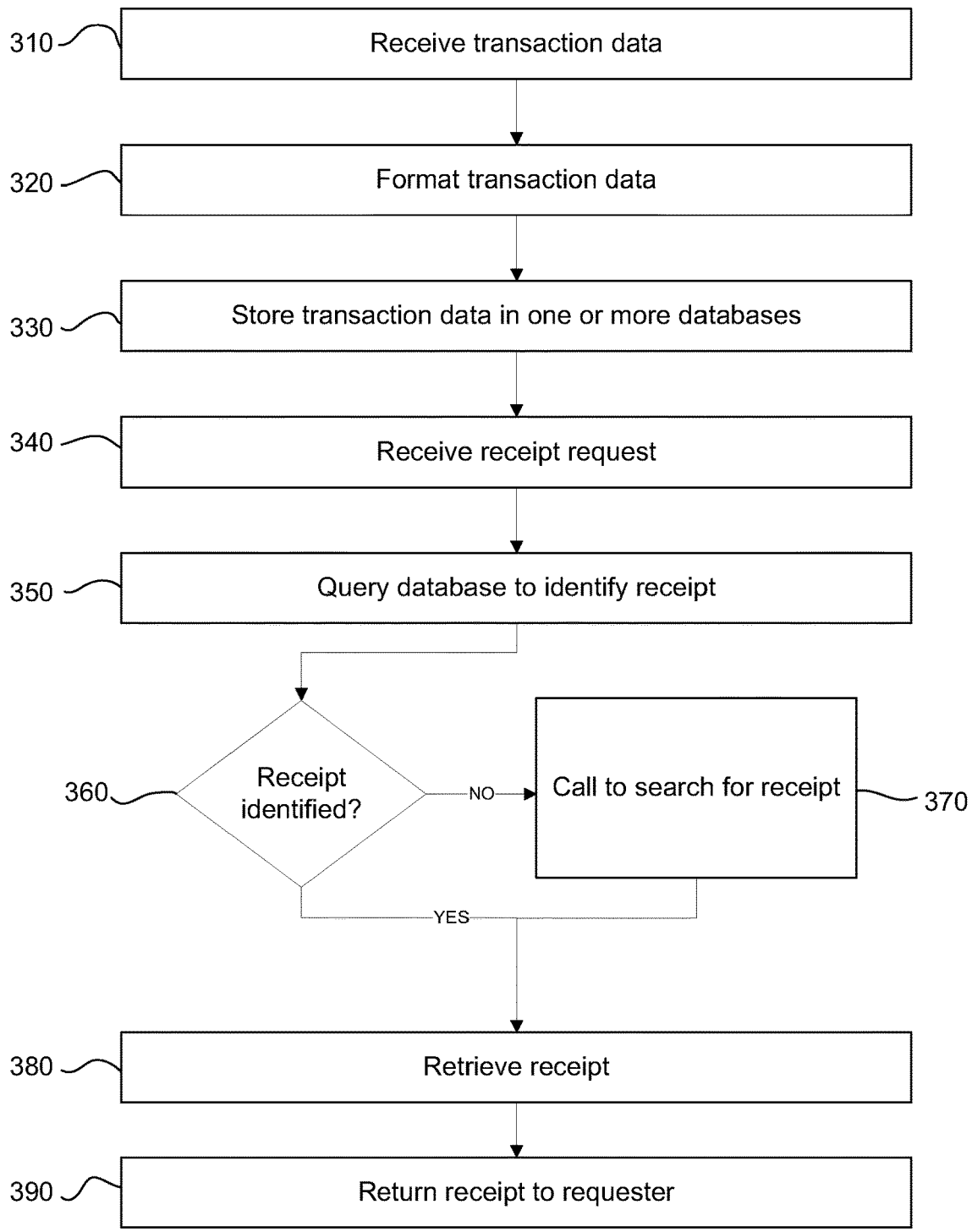

FIG. 3 is a flow diagram 300 of a transaction management method according to an embodiment. Method 300 may be performed, for example, by auxiliary transaction tracking system 150. Referring to FIG. 3, auxiliary transaction tracking system 150 receives 310 transaction data (e.g., from one or more merchant systems 130). The transaction data may be received individually or in batches. The auxiliary transaction tracking system 150 may format 320 the transaction data for processing, storage, and management. An example of the formatting 330 is described below with reference to FIG. 4.

Figure 4:
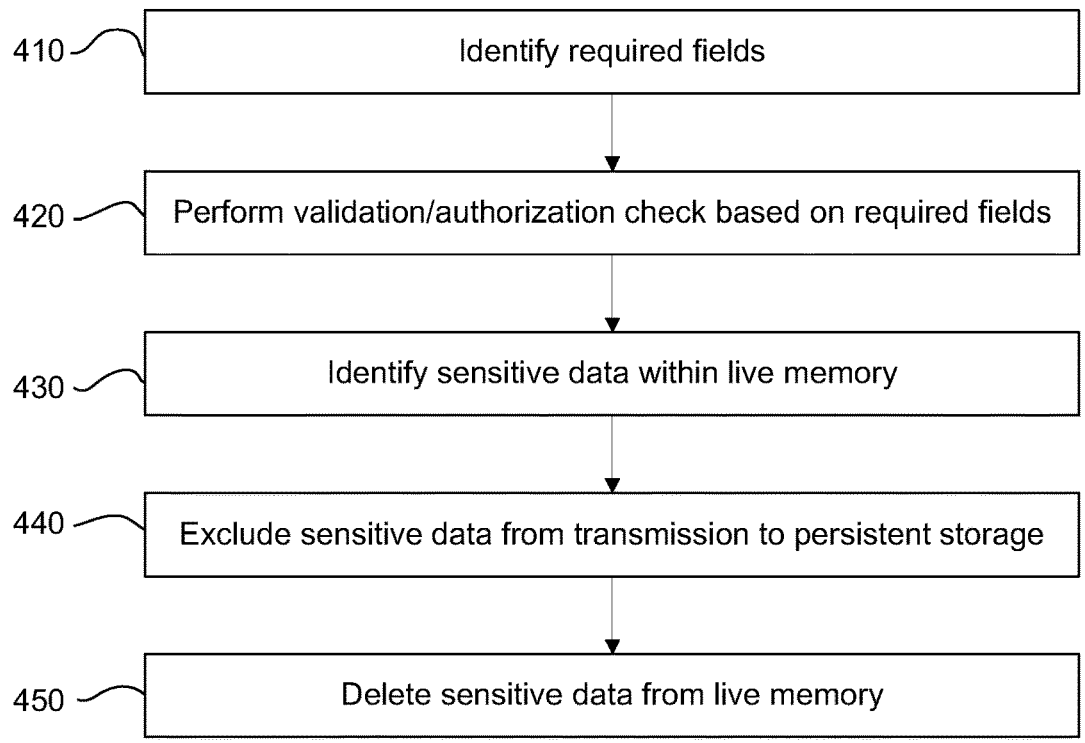
FIG. 4 is a flow diagram of active scrubbing of sensitive information within live memory according to an example embodiment.

In some cases, auxiliary transaction system 150 may be configured to actively scrub sensitive information within its live memory (e.g., transient or volatile memory, such as RAM). As will be understood by one of ordinary skill, personal information may be considered highly sensitive and be subject to significant oversight requirements. Accordingly, by actively removing such personal information, data security and user privacy can be increased. FIG. 4 illustrates a flow diagram 400 of active scrubbing of sensitive information within live memory according to an example embodiment.

Auxiliary transaction system 150 processes 410 the transaction data to identify required fields. For example, the required fields may include a transaction amount, a merchant name or identifier, and transaction date and time. In some cases, the required fields may include additional information, for example, a transaction confirmation number, a last four digits of a payment account, and/or a unique customer token. Utilizing the required fields, auxiliary transaction system 150 performs 420 data validation and authorization based thereon.

Next, the auxiliary transaction system 150 identifies, within the transaction data, sensitive information within live memory. For example, auxiliary transaction system 150 can heuristically identify customer names and contact information that need not be included with the transaction data. That is, according to aspects of the present disclosure, transaction data can be linked to customers without the explicit use of traditional personally identifiable information. The auxiliary transaction system 150 can then isolate the sensitive data and exclude 440 the sensitive data from transmission to a persistent storage. For example, auxiliary transaction system 150 can provide technology for isolating and extracting sensitive data from the communication stream. This physical isolation within live memory can create a new, sanitized transaction data in a new format. The sensitive data can then be deleted 450 from live memory by the auxiliary transaction system 150. In some cases, the transaction data (e.g., from a particular merchant) may be formatted with personal information in consistent locations and/or data fields. In some implementations, auxiliary transaction system 150 may actively scrub the data by identifying the locations in the transaction data in live memory without having to process the transaction data.

Although active scrubbing has been described as being performed by auxiliary transaction system 150, this is merely an example. In some cases, all or a portion of the active scrubbing may be performed by merchant transaction server 134. For example, merchant transaction server 134 may execute a program to interface with auxiliary transaction tracking system 150. The program may actively scrub the data within merchant transaction server 134 prior to sending the data to auxiliary transaction tracking system 150, thereby preventing auxiliary transaction tracking system 150 from receiving the data or potentially exposing the personal information in a transmission outside of merchant system 130.

Referring back to FIG. 3, the auxiliary transaction system 150 stores 330 the transaction data in one or more databases. For example, auxiliary transaction system 150 can store the transaction data within a first, relational database for internal use and searching, and a second, document-database formatted database for rapid searching and return of receipt data. Auxiliary transaction system 150 may further sync between a plurality of databases to identify issues in either. This live memory management can keep the database systems clean from sensitive data.

Later, the auxiliary transaction system 150 can receive 340 a receipt request, for example, from financial system 170 or financial compilation system 180. The financial request may include a plurality of required data fields. For example, the request may include no sensitive information, such as a transaction amount, a merchant name or identifier, and/or a transaction date and time. In some cases, the request may include potentially or semi-sensitive data, such as a transaction confirmation number, a last four digits of a payment account, and/or a unique customer token. The transaction data may actively scrub the data request, for example, following a formatting process similar to that described with reference to FIG. 4. By actively scrubbing memory of sensitive data, the system minimizes exposure of the sensitive data and can provide transaction and receipt matching without the use of personalized information.

Once the receipt request is received, auxiliary transaction system 150 queries 350 the database(s) to identify transaction data corresponding to the provided transaction information. If the transaction data is found (360-YES), it is retrieved 380 from the database(s) and returned 390 to the requester. If the transaction data is not found within the database(s) (360-No), auxiliary transaction system 150 calls 370 to a merchant (e.g., merchants system 130) to retrieve the transaction data.

Figure 5:
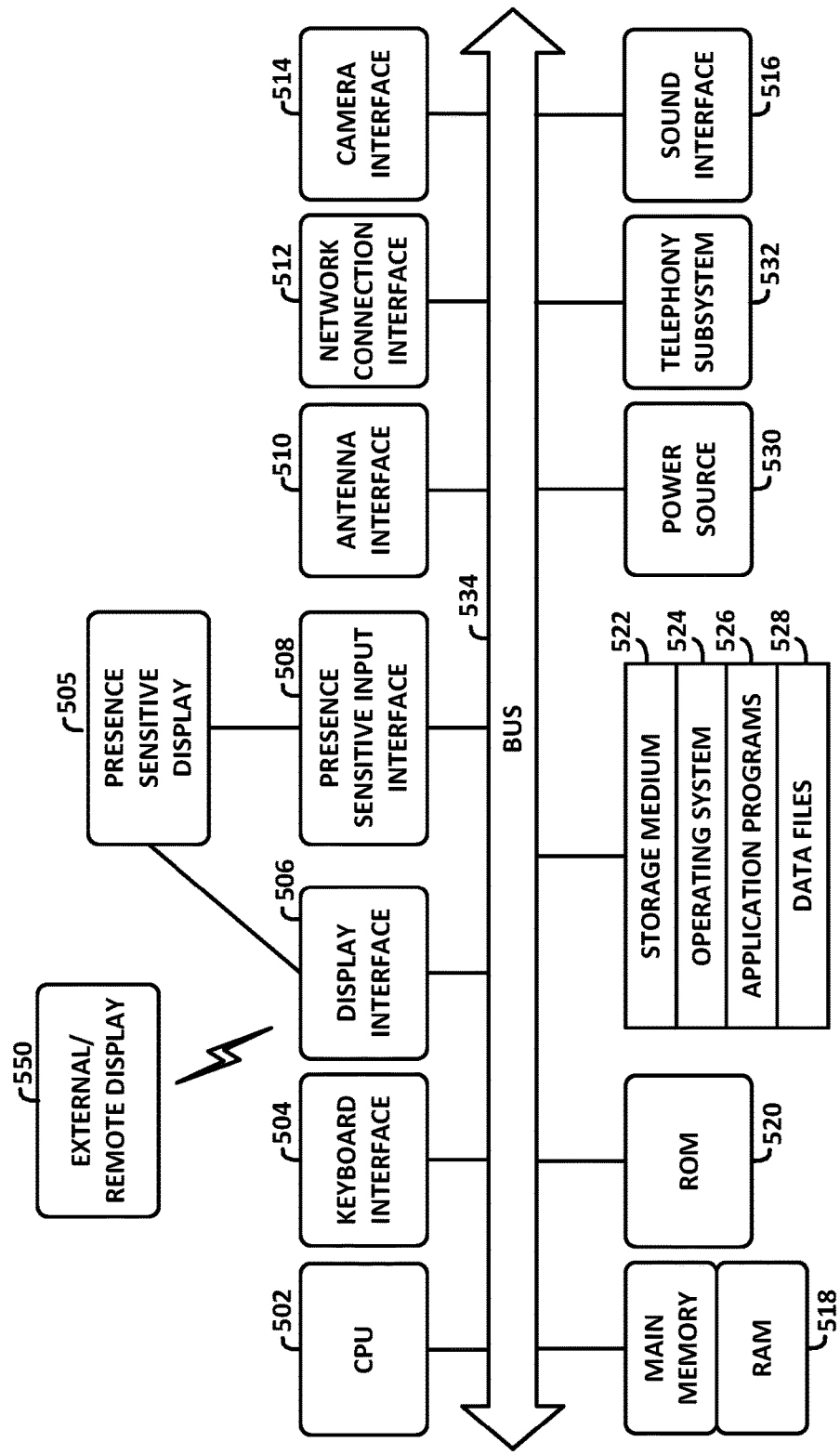
FIG. 5 is a block diagram of an illustrative computer system architecture, according to an example implementation.

FIG. 5 is a block diagram of an illustrative computer system architecture 500, according to an example implementation. The computer system architecture 500 may be used to implement one or more example embodiments within the scope of the present disclosure. In some cases, one or more elements of the computer system architecture 500 may be combined to embody one or more of UE 110, merchant system 130, auxiliary transaction tracking system 150, financial system 170, financial compilation system 180, transaction processor 190, or various components thereof. It will be understood that the computing device architecture 500 is provided for example purposes only and does not limit the scope of the various implementations of the present disclosed systems, methods, and computer-readable mediums.

The computing device architecture 500 of FIG. 5 includes a central processing unit (CPU) 502, where computer instructions are processed, and a display interface 506 that acts as a communication interface and provides functions for rendering video, graphics, images, and texts on the display. In certain example implementations of the disclosed technology, the display interface 506 may be directly connected to a local display, such as a touch-screen display associated with a mobile computing device. In another example implementation, the display interface 506 may be configured for providing data, images, and other information for an external/remote display 550 that is not necessarily physically connected to the mobile computing device. For example, a desktop monitor may be used for mirroring graphics and other information that is presented on a mobile computing device. In certain example implementations, the display interface 506 may wirelessly communicate, for example, via a Wi-Fi channel or other available network connection interface 512 to the external/remote display 550.

In an example implementation, the network connection interface 512 may be configured as a communication interface and may provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 506 may be operatively coupled to a local display, such as a touch-screen display associated with a mobile device. In another example, the display interface 506 may be configured to provide video, graphics, images, text, other information, or any combination thereof for an external/remote display 550 that is not necessarily connected to the mobile computing device. In one example, a desktop monitor may be used for mirroring or extending graphical information that may be presented on a mobile device. In another example, the display interface 506 may wirelessly communicate, for example, via the network connection interface 512 such as a Wi-Fi transceiver to the external/remote display 550.

The computing device architecture 500 may include a keyboard interface 504 that provides a communication interface to a keyboard. In one example implementation, the computing device architecture 500 may include a presence-sensitive display interface 508 for connecting to a presence-sensitive display 505. According to certain example implementations of the disclosed technology, the presence-sensitive display interface 508 may provide a communication interface to various devices such as a pointing device, a touch screen, a depth camera, etc. which may or may not be associated with a display.

The computing device architecture 500 may be configured to use an input device via one or more of input/output interfaces (for example, the keyboard interface 504, the display interface 506, the presence-sensitive display interface 508, network connection interface 512, camera interface 514, sound interface 516, etc.) to allow a user to capture information into the computing device architecture 500. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 500 or may be a separate device. For example, the input device may be an accelerometer, a magnetometer, a digital camera, a microphone, and an optical sensor.

Example implementations of the computing device architecture 500 may include an antenna interface 510 that provides a communication interface to an antenna; a network connection interface 512 that provides a communication interface to a network. As mentioned above, the display interface 506 may be in communication with the network connection interface 512, for example, to provide information for display on a remote display that is not directly connected or attached to the system. In certain implementations, a camera interface 514 is provided, which acts as a communication interface and provides functions for capturing digital images from a camera. In certain implementations, a sound interface 516 is provided as a communication interface for converting sound into electrical signals using a microphone and for converting electrical signals into sound using a speaker. According to example implementations, a random-access memory (RAM) 518 is provided, where computer instructions and data may be stored in a volatile memory device for processing by the CPU 502.

According to an example implementation, the computing device architecture 500 includes a read-only memory (ROM) 520 where invariant low-level system code or data for basic system functions such as basic input and output (I/O), startup, or reception of keystrokes from a keyboard are stored in a non-volatile memory device. According to an example implementation, the computing device architecture 500 includes a storage medium 522 or other suitable type of memory (e.g., such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 524, application programs 526 (including, for example, a web browser application, a widget or gadget engine, and or other applications, as necessary) and data files 528 are stored. According to an example implementation, the computing device architecture 500 includes a power source 530 that provides an appropriate alternating current (AC) or direct current (DC) to power components.

According to an example implementation, the computing device architecture 500 includes a telephony subsystem 532 that allows the device 500 to transmit and receive sound over a telephone network. The constituent devices and the CPU 502 communicate with each other over a bus 534.

According to an example implementation, the CPU 502 has appropriate structure to be a computer processor. In one arrangement, the CPU 502 may include more than one processing unit. The RAM 518 interfaces with the computer bus 534 to provide quick RAM storage to the CPU 502 during the execution of software programs such as the operating system application programs, and device drivers.

More specifically, the CPU 502 loads computer-executable process steps from the storage medium 522 or other media into a field of the RAM 518 in order to execute software programs. Data may be stored in the RAM 518, where the data may be accessed by the computer CPU 502 during execution.

The storage medium 522 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 522, which may include a machine-readable storage medium.

According to one example implementation, the term computing device, as used herein, may be a CPU, or conceptualized as a CPU (for example, the CPU 502 of FIG. 5). In this example implementation, the computing device (CPU) may be coupled, connected, and/or in communication with one or more peripheral devices, such as display. In another example implementation, the term computing device, as used herein, may refer to a mobile computing device such as a smart phone, tablet computer, or smart watch. In this example implementation, the computing device may output content to its local display and/or speaker (s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be used to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

According to some implementations, computer program code may be configured to control a computer device, e.g., the computer system architecture 500, to implement one or more components of one or more embodiments. According to some implementations, computer program code may be configured to control a computer device implement one or more methods within the scope of the present disclosure.

Although some example embodiments described herein have been described in language specific to computer structural features, methodological acts, and by computer readable media (e.g., non-transitory computer readable media), it is to be understood that the disclosure is not necessarily limited to the specific structures, acts or media described. Therefore, the specific structural features, acts and mediums are disclosed as example embodiments implementing the disclosure. The present disclosure is intended to cover various modifications and equivalent arrangements including those within the scope of the appended claims and their equivalents. Although specific terms are employed herein, they are used in a generic and descriptive sense only and not for purposes of limitation.

Although example embodiments of the present disclosure described herein are explained in detail, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise. Moreover, titles or subtitles may be used in this specification for the convenience of a reader, which shall have no influence on the scope of the present disclosure.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, certain terminology has been resorted to for the sake of clarity. It is intended that each term contemplates its broadest meaning as understood by those skilled in the art and includes all technical equivalents that operate in a similar manner to accomplish a similar purpose.

It is to be understood that the mention of one or more steps or blocks of a method does not preclude the presence of additional method steps or intervening method steps between those steps expressly identified. Steps of a method may be performed in a different order than those described herein. Similarly, it is also to be understood that the mention of one or more components in a device or system does not preclude the presence of additional components or intervening components between those components expressly identified.

What is claimed is:

1. A system comprising:
   a processor;
   a persistent storage; and a memory comprising a live memory, wherein the memory stores instructions that, when executed by the processor, causes the processor to perform steps of:
  receiving transaction data from a plurality of merchant systems for a plurality of transactions, wherein the plurality of transactions are associated with a plurality of purchasers, wherein the received transaction data are in the live memory;
  actively scrubbing sensitive data from the transaction data, wherein the actively scrubbing the sensitive data from the transaction data comprises:
    identifying, while the transaction data is in the live memory, the sensitive data contained within the transaction data in the live memory, wherein the sensitive data comprises at least one from among a customer name, a transaction account number,
    excluding the identified sensitive data from transmission to the persistent storage, and
    purging the identified sensitive data from the live memory by deleting the sensitive data from the transaction data in the live memory;
  formatting the scrubbed transaction data into receipt data, wherein the formatted receipt data comprises merchant identifiers, information of transaction time and date, information of transaction amount, line-item transaction details wherein the formatted receipt data does not comprise the sensitive data;
  storing the formatted receipt data as receipt records for one or more plurality of transactions in a receipt database;
  receiving a receipt request for a transaction from a remote device associated with a user account, wherein the user account is associated with one of the plurality of purchasers, wherein the receipt request comprises a customer identification token, a merchant identifier, a transaction amount, and a transaction date and time;
  querying the receipt database for a receipt record corresponding to the transaction of the user account based on the merchant identifier, the transaction amount, and the transaction date and time comprised in the receipt request;
  based on the query, identifying the receipt record corresponding to the transaction, wherein the identifying the receipt record comprises line-item information contained in the receipt record, wherein the line-item information is associated with the merchant identifier;
  in response to identifying the receipt record corresponding to the transaction, retrieving the receipt record corresponding to the transaction from the receipt database;
  appending the customer identification token to the receipt record corresponding to the transaction; and
  outputting the receipt record for transmission to the remote device in response to the received receipt request.

2. The system of claim 1, wherein the instructions, when executed by the processor, further cause the processor to perform steps of:
  determining whether the receipt record corresponding to the transaction is included in the receipt database;
  in response to determining that the receipt record corresponding to the transaction is not included in the receipt database:
    outputting, to a merchant system associated with the merchant identifier, a request for updated transaction data;
    receiving, from the merchant system associated with the merchant identifier, the updated transaction data; and
    generating the receipt record corresponding to the transaction from the updated transaction data.

3. The system of claim 1, wherein the receipt request includes a transaction identification information and other sensitive data, and wherein the instructions, when executed by the processor, further cause the processor to perform additional step of:
  scrubbing the other sensitive data contained in the receipt request.

4. The system of claim 3, wherein scrubbing the other sensitive data comprises:
  identifying, while the transaction identification information and the other sensitive data are in the live memory, the other sensitive data contained within the receipt request;
  excluding the other sensitive data from transmission to the persistent storage; and
  purging the other sensitive data from the live memory.

5. The system of claim 1, wherein the receiving the transaction data from the plurality of the merchant systems in a batch of transactions.

6. The system of claim 1, wherein the receipt request comprises a customer identification token, and wherein the instructions, when executed by the processor, further cause the processor to perform a step of:
  appending the customer identification token to the receipt record for transmission to the remote device.

7. A method using a system comprising a processor, a persistent storage and a memory comprising a live memory, the method comprising:
  receiving, by the processor, transaction data from a plurality of merchant systems for a plurality of transactions, wherein the plurality of transactions are associated with a plurality of purchasers, wherein the received transaction data are in the live memory;
  actively scrubbing, by the processor, sensitive data from the transaction data, wherein the actively scrubbing the sensitive data from the transaction data comprises:
    identifying, while the transaction data is in the live memory, the sensitive data contained within the transaction data in the live memory, wherein the sensitive data comprises at least one from among a customer name, a transaction account number,
    excluding the identified sensitive data from transmission to the persistent storage, and
    purging the identified sensitive data from the live memory by deleting the sensitive data from the transaction data in the live memory;
  formatting, by the processor, the scrubbed transaction data into receipt data, wherein the formatted receipt data comprises merchant identifiers, information of transaction time and date, information of transaction amount, line-item transaction details wherein the formatted receipt data does not comprise the sensitive data;
  storing, by the processor, the formatted receipt data as receipt records for one or more plurality of transactions in a receipt database;
  receiving, by the processor, a receipt request for a transaction from a remote device associated with a user account, wherein the user account is associated with one of the plurality of purchasers, wherein the receipt request comprises a customer identification token, a merchant identifier, a transaction amount, and a transaction date and time;

querying, by the processor, the receipt database for a receipt record corresponding to the transaction of the user account based on the merchant identifier, the transaction amount, and the transaction date and time;

based on the query, identifying, by the processor, the receipt record corresponding to the transaction, wherein the identifying the receipt record comprises line-item information contained in the receipt record, wherein the line-item information is associated with the merchant identifier;

in response to identifying the receipt record corresponding to the transaction, retrieving, by the processor, the receipt record corresponding to the transaction from the receipt database;

appending, by the processor, the customer identification token to the receipt record corresponding to the transaction; and outputting, by the processor, the receipt record for transmission to the remote device in response to the received receipt request.

8. The method of claim 7, wherein the receipt request includes transaction identification information including at least one from among the transaction amount, a merchant name or the merchant identifier, and the transaction date and time, the querying the receipt database being based on the transaction identification information.

9. The method of claim 7 further comprising:
determining, by the processor, whether the receipt record is in the receipt database;
in response to determining that the receipt record is not included in the receipt database:
outputting, by the processor, to a merchant system associated with the transaction, a request for receipt data; and
receiving, by the processor, from the merchant system, the receipt data.

10. The method of claim 7, wherein the receipt request includes a transaction identification information and other sensitive data, and the method further comprises:
scrubbing the sensitive data of the receipt request.

11. The method of claim 10, wherein scrubbing the other sensitive data comprises:
identifying, while the transaction identification information and the other sensitive data are in the live memory, the other sensitive data contained within the receipt request;
excluding the other sensitive data from transmission to the persistent storage; and
purging the other sensitive data from the live memory.

12. The method of claim 7, wherein scrubbing the transaction data is performed on the merchant system.

13. A system comprising:
a processor;
a persistent storage; and
a memory comprising a live memory, wherein the memory stores instructions that, when executed by the processor, cause the processor to perform steps of:
receiving transaction data from a plurality of merchant systems for a plurality of transactions, wherein the plurality of transactions are associated with a plurality of purchasers, wherein the received transaction data are in the live memory;

actively scrubbing the transaction data of sensitive data, wherein the actively scrubbing the transaction data of sensitive data comprises:
identifying, while the transaction data is in the live memory, sensitive data contained within the transaction data in the live memory, wherein the sensitive data comprises at least one from among a customer name, a transaction account number,
excluding the identified sensitive data from transmission to a persistent storage, and
purging the identified sensitive data from the live memory by deleting the sensitive data from the transaction data in the live memory;
formatting the scrubbed transaction data into receipt data, wherein the formatted receipt data comprises merchant identifiers, information of transaction time and date, information of transaction amount, line-item transaction details wherein the formatted receipt data does not comprise the sensitive data;
storing the receipt data as receipt records for one or more plurality of transactions in a receipt database;
receiving a receipt request for a transaction from a remote device associated with a user account, wherein the user account is associated with one of the plurality of purchasers, wherein the receipt request comprises a customer identification token, a merchant identifier, a transaction amount, and a transaction date and time;
querying the receipt database for a receipt record corresponding to the transaction based on the merchant identifier, the transaction amount, and the transaction date and time;
based on the query, determining whether the receipt record corresponding to the transaction is included in the receipt database based on the querying;
in response to the determining that the receipt record corresponding to the transaction is included in the receipt database:
identifying the receipt record corresponding to the transaction, wherein the identifying the receipt record comprises line-item information contained in the receipt record, wherein the line-item information is associated with the merchant identifier;
in response to identifying the receipt record corresponding to the transaction, retrieving the receipt record corresponding to the transaction from the receipt database; or
in response to determining that the receipt record corresponding to the transaction is not included in the receipt database:
outputting, to a merchant system associated with the merchant identifier, a request for updated transaction data;
receiving, from the merchant system associated with the merchant identifier, the updated transaction data; and
generating the receipt record corresponding to the transaction from the updated transaction data;
appending the customer identification token to the receipt record corresponding to the transaction; and
outputting the receipt record for transmission to the remote device in response to the received receipt request.

* * * * *